E (12) United States Patent  
Zhu

US007655082B2

(10) Patent No.: US 7,655,082 B2
(45) Date of Patent: Feb. 2, 2010

(54) INK COMPOSITIONS CONTAINING AN EMULSION

(75) Inventor: Jiandong Zhu, Aurora, IL (US)

(73) Assignee: Sanford, L.P., Oak Brook, IL (US)

( * ) Notice: Subject to any disclaimer, the term of this patent is extended or adjusted under 35 U.S.C. 154(b) by 80 days.

(21) Appl. No.: 11/675,609

(22) Filed: Feb. 15, 2007

(65) Prior Publication Data

US 2008/0196622 A1 Aug. 21, 2008

(51) Int. Cl.
C09D 11/00 (2006.01)
(52) U.S. Cl. .................. 106/31.25; 106/31.26
(58) Field of Classification Search ........... 106/31.25, 106/31.26
See application file for complete search history.

(56) References Cited

U.S. PATENT DOCUMENTS

| 3,043,784 A | | 7/1962 | Remer | |
|---|---|---|---|---|
| 4,910,236 A | | 3/1990 | Foye et al. | |
| 5,637,137 A | * | 6/1997 | Okuda et al. ............. | 106/31.26 |
| 5,725,646 A | | 3/1998 | Krishnan et al. | |
| 5,746,815 A | * | 5/1998 | Caputo ..................... | 106/31.25 |
| 5,779,777 A | * | 7/1998 | Okuda et al. ............. | 106/31.26 |
| 5,880,214 A | * | 3/1999 | Okuda ...................... | 106/31.25 |
| 5,945,484 A | * | 8/1999 | Fukasawa ................ | 106/31.26 |
| 5,951,188 A | | 9/1999 | Loftin | |
| 5,969,004 A | | 10/1999 | Loftin | |
| 6,025,412 A | | 2/2000 | Sacripante et al. | |
| 6,156,109 A | * | 12/2000 | Asada ...................... | 106/31.26 |
| 6,165,258 A | * | 12/2000 | Asada ...................... | 106/31.26 |
| 6,342,094 B1 | * | 1/2002 | Kabalnov ................. | 106/31.25 |
| 6,398,441 B1 | | 6/2002 | Takayanagi et al. | |
| 6,450,719 B1 | | 9/2002 | Causton et al. | |
| 6,527,842 B1 | * | 3/2003 | Adams et al. ............ | 106/31.26 |
| 6,562,116 B1 | | 5/2003 | Satoh et al. | |
| 6,663,701 B2 | * | 12/2003 | Ogawa et al. ............ | 106/31.25 |
| 6,770,687 B1 | | 8/2004 | Tan et al. | |
| 6,786,958 B2 | | 9/2004 | Morita et al. | |
| 6,899,487 B2 | | 5/2005 | Fujii et al. | |
| 7,008,474 B2 | | 3/2006 | Konno et al. | |
| 7,192,472 B2 | * | 3/2007 | Hermansky .............. | 106/31.25 |
| 7,396,400 B2 | | 7/2008 | Nakamura et al. ....... | 106/31.58 |
| 2004/0003753 A1 | * | 1/2004 | Matsuda et al. ......... | 106/31.26 |
| 2005/0042019 A1 | | 2/2005 | Gaynes et al. | |
| 2005/0239919 A1 | * | 10/2005 | Ono ......................... | 523/160 |
| 2005/0249538 A1 | | 11/2005 | Patel | |

FOREIGN PATENT DOCUMENTS

| EP | 0 273 236 | 7/1988 |
|---|---|---|
| EP | 1 416 020 | 5/2004 |
| EP | 1 591 499 | 11/2005 |
| GB | 2 063 900 | 6/1981 |
| JP | 58-002367 | 1/1983 |
| JP | 58-063765 | 4/1983 |
| JP | 58-063766 | 4/1983 |

OTHER PUBLICATIONS

Anon, "Ink Vehicle," *Am. Ink. Maker*, 67(4):102; Apr. 1989.
Anon, "Polymers Used as Ink Vehicles," *Flexo*, 16(5):138 (1991).
Aspler, "Ink-Water-Paper Interactions in Printing: An Updated Review," *TAPPI Advanced Coating Fundamentals Symposium*, pp. 1-30 (2006).
Baldassare, "Environmental Resin's Performance in Low Rub Black Offset Inks," *Am. Ink Maker*, 74(4):48,51-52,54,56,58; Apr. 1996.
Chapatwala et al., "Thickeners in Printing of Synthetic Textiles Nylon, Polyester & Cationic Dyeable Polyester," *Man-Made Text. India*, 33(11-12):472-477, Nov. 1990.
Cheng et al., "Developing Pigmented Inks for Thermal Ink Jet," *IS&T's NIP18: 2002 International Conference on Digital Printing Technologies*, 762-765 (2002).
Cheng et al., "Developing Smear-Free Pigmented Inks for Thermal Ink Jet," *IS&T's NIP16: 2000 International Conference on Digital Printing Technologies*, 636-639 (2000).
Faulkner, "Current Resin Development for Water-Based Inks," *Ink & Print*, 2(3):18-20 (1984).
Field et al., "Proper Water Ink pH Content Helps Achieve Quality Graphics," *Flexo*, 14(4):40-43, Apr. 1989.
Gruber et al., "The Development of Photoelectrophoretic Colorants and Inks," Paper Presented at the Third International Congress on *Advances in Non-Impact Technologies*, pp. 436-450 (1986).
Knodler, "Water-Based Inks: Possibilities and Limitations in Flexo and Gravure Printing," *Export Polygraph Int.*, 37(5):26,28,30; May 1989.
Mathieu, "Waterbased Inks, Today and Tomorrow," *Euro Flexo Mag.*, 3(6):33-35; Jun. 1987.
Rosenberg, "Influence of Fillers on Rheology, Emulsification and Printing Properties of Offset Inks," Paper Presented at *21st Research Conference of the International Association of Research Institutes for the Graphic Arts Industry* (IARIGAI), pp. 328-345 (1991).
Sawada et al., "Effects of Glycine Derivatives in Dispersed Colorant Based Inks," *IST's NIP19: 2003 International Conference on Digital Printing Technologies*, 241-244 (2003).
Schmidhauser, "A New pH Neutral Waterborne Dispersing Resin for Metallic and Organic Pigments," *Ink World*, 6(5):49-50, 53-56; May 2001.
Sirost, "Les Encres Heat Set," *Caractere*, 264: 38-41, Jul. 1989.
Wong et al., "Sterically Stabilized Polymer Colloids and Their Use as Ink-Jet Inks," Paper Presented at the Third International Congress on *Advances in Non-Impact Technologies*, pp. 270-275 (1986).
Schretzmann, "Ink Systems Based on Water," *Silk Screen*, 41(6):14, 16-17 (1993).
Sirost, "Heatset Inks," *Nouv. Gr.*, 41(3):8-9, 11-13 (1991).
International Search Report for International Application No. PCT/US2008/054055, dated Jul. 16, 2008.
Written Opinion for International Application No. PCT/US2008/054055, dated Jul. 16, 2008.

\* cited by examiner

*Primary Examiner*—Helene Klemanski
(74) *Attorney, Agent, or Firm*—Marshall, Gerstein & Borun LLP

(57) ABSTRACT

The application discloses ink compositions containing an emulsion and, more particularly, to ink compositions containing an emulsified colorant and/or an emulsified lubricating agent, and writing instruments containing same.

18 Claims, No Drawings

INK COMPOSITIONS CONTAINING AN EMULSION

BACKGROUND OR THE DISCLOSURE

1. Field of the Disclosure

The disclosure is generally related to ink compositions containing an emulsion and, more particularly, to ink compositions containing an emulsified colorant and/or an emulsified lubricating agent, and writing instruments containing same.

2. Brief Description of Related Technology

Many writing instruments can generally be categorized as either ball pens or markers. Ball pens can often be further characterized, for example, as roller ball pens, gel pens, or ball point pens. Markers can often also be further characterized, for example, as permanent markers, highlighters, dry erase markers, washable markers, and/or other special purpose markers (e.g., metallic markers, correction markers, and other special purpose markers).

A significant problem for ball point pens involves a lack of writing smoothness. A variety of solutions have been implemented to address this deficiency including but not limited to (1) lowering the viscosity of the ink composition, for example, by using various polymer resins and solvent combinations to regulate/reduce its elasticity and/or viscosity, (2) adding miscible lubricants to the ink composition, (3) adding shear-thinning additives capable of demonstrating thixotropic effects to the ink composition, and/or (4) increasing the size of the ball, particularly, in combination with reducing the ink composition viscosity. However, writing smoothness remains an issue for many ball pens.

A significant problem for markers containing pigmented ink compositions involves pigment settling. Pigment settling can occur both when the ink composition is stored in bulk and when it is in an ink delivery system (such as a capillary reservoir system). Pigment settling in an ink delivery system can be particularly problematic for a consumer because it can result in the delivery of an ink composition that does not contain a sufficient and/or intended amount of colorant. To counteract pigment settling, dispersing agents, resins, and additives such as viscosity modifiers have been added to both water- and solvent-based inks so as to stabilize pigment dispersions therein. However, success in eliminating pigment settling has been limited. Consequently, many markers containing pigmented ink compositions should be positioned/orientated in a tip-down fashion otherwise the color intensity of the ink will deleteriously change during the writing life of the markers.

DETAILED DESCRIPTION

The disclosure provides ink compositions which contain an emulsion. More specifically, the ink compositions contain an emulsified lubricating agent and/or an emulsified colorant, for example, an emulsified pigment dispersion, an emulsified liquid dye, and/or an emulsified dye solution. Such ink compositions (1) write smoothly when used to produce written markings (at least relative to ink compositions not containing an emulsified lubricating agent), (2) can be used to make markings demonstrating improved fade resistance (at least relative to ink compositions not containing an emulsified pigment), (3) contain pigments that do not appreciably settle out over time, for example, when stored in bulk or in an ink system such as a capillary system (at least relative to ink compositions not containing an emulsified pigment), and/or (4) demonstrate less smearing and/or color penetration (at least relative to ink compositions not containing an emulsified colorant). Additionally, such ink compositions can advantageously include components which would otherwise be incompatible with a particular ink composition (e.g., by emulsifying a water-soluble dye, such a dye could be used in a solvent-based ink composition).

An emulsion can generally be defined as a significantly stable suspension (from seconds to years) of particles of liquid of certain size within a second immiscible liquid. See Milton, Surfactants and Interfacial Phenomena, $3^{rd}$ ed., Wiley-Interscience, New Jersey. One liquid (the dispersed phase) is dispersed in the other liquid (the continuous phase). Typically, one of the dispersed and continuous phases is an oily or relatively non-polar phase and the other is an aqueous or relatively polar phase. Such emulsions include but are not limited to macroemulsions (particle size diameter between about 500 nm and about 50,000 nm), mini- or nano-emulsions (particle size diameter between about 100 nm and about 500 nm), and microemulsions (particle size diameter between about 10 nm and about 100 nm).

Emulsifying agents such as surface active substances can significantly increase the kinetic stability of emulsions, thereby facilitating long term storage. The phase in which an emulsifying agent is more soluble generally constitutes the continuous phase. For example, in oil-in-water (O/W) emulsions, emulsifying agents are typically more soluble in the aqueous or relatively polar phase than in the oil or relatively non-polar phase. Similarly, in water-in-oil (W/O) emulsions, emulsifying agents are typically more soluble in the oil or relatively non-polar phase than in the water or relatively polar phase.

Emulsions can also generally be classified as oil-in-water (O/W) emulsions or water-in-oil (W/O) emulsions, but in some instances such emulsions can be further classified as multiple emulsions such as water-in-oil-in-water (W/O/W) emulsions, and/or oil-in-water-in-oil (O/W/O) emulsions. As used herein, the term "O/W emulsion" includes any emulsion wherein an oil or relatively non-polar phase is dispersed in an aqueous or relatively polar phase. Similarly, the term the term "W/O emulsion" includes any emulsion wherein an aqueous or relatively polar phase is dispersed in an oil or relatively non-polar phase. Notwithstanding the foregoing definitions and description, the term emulsion as used herein also includes bicontinuous emulsions wherein both (1) the aqueous or polar phase and (2) the oily or non-polar phases are continuous phases. Bicontinuous emulsions are sometimes referred to in the scientific literature as Winsor type IV microemulsions.

The inks according to the disclosure include but are not limited to any of the foregoing emulsions.

Exemplary solvents for the water or relatively polar phase include but are not limited to water, ethylene glycol, propylene glycol, glycol ethers including but not limited to ethylene glycol monomethyl ether, ethylene glycol monoethyl ether, ethylene glycol monobutyl ether, ethylene glycol monophenyl ether, propylene glycol monomethyl ether, propylene glycol monoethyl ether, propylene glycol monobutyl ether, propylene glycol monophenyl ether, and similar solvents, alcohols including but not limited to ethanol, propanols, butanols, octanols, and similar solvents, and mixtures thereof. Exemplary solvents for the oil or relatively non-polar phase include but are not limited to oils including but not limited to mineral oils, silicone oils, and similar solvents, aliphatic hydrocarbon solvents including but not limited to hexanes (e.g., methylcyclohexane), heptanes, decanes, hexadecanes, octadecanes, VM&P Naptha solvents, and similar solvents, and aromatic solvents including but not limited to benzenes, toluenes, and similar solvents, and mixtures thereof.

In a first aspect, the disclosure provides ink compositions including a lubricating agent emulsified therein. When used to make written markings, such ink compositions demonstrate improved writing smoothness at least relative ink compositions not containing such an emulsified lubricating agent.

In another aspect, the disclosure provides ink compositions including a colorant emulsified therein. Ink compositions containing an emulsified pigment dispersion generally demonstrate improved performance when stored in bulk (e.g., the pigments of such inks do not appreciably settle out over time) at least relative to ink compositions not containing an emulsified pigment. Further, such ink compositions generally demonstrate improved performance when stored in an ink delivery system (e.g., the pigments of such inks do not appreciably settle out over time) at least relative to writing instruments including ink compositions that do not contain an emulsified pigment. Moreover, when used to make written markings, such ink compositions demonstrate improved fade resistance at least relative to ink compositions not containing an emulsified pigment. Emulsified dyes can also be included in the ink compositions. Including an emulsified dye component into an ink system is advantageous because it allows, for example, a solvent dye to be incorporated into an aqueous ink composition, or for a water-soluble dye to be incorporated into a solvent-based ink composition.

In a further aspect, the disclosure provides ink compositions including a colorant emulsified therein and a lubricating agent emulsified therein. This can be accomplished by emulsifying a pigment in oil dispersion, a pigment in relatively non-polar solvent dispersion, or a dye in oil solution into the ink compositions.

In yet another aspect, the disclosure provides writing instruments containing ink compositions according to at least one of the first, second, and third aspects. The writing instrument may be a ball pen, for example, a roller ball pen, a gel pen, or a ball point pens, or a marker having one of a fibrous reservoir and a free ink reservoir, and one of an extruded plastic tip and a fibrous nib.

Alternatively, the compositions in accordance with the disclosure can be loaded into paint brush applicators having application elements comprising brushes, for example, as disclosed in U.S. Patent Publication No. 2005/0042019 A1, the entire disclosure of which is hereby incorporated herein by reference. Similarly, the compositions in accordance with the disclosure can be loaded into correction fluid applicators having application elements comprising brushes or foam wedges, for example, as disclosed in U.S. Patent Publication No. 2005/0249538 A1, the entire disclosure of which is hereby incorporated herein by reference.

The continuous phase generally comprises at least one solvent and at least one emulsifying agent, and optionally further includes at least one polymer or resin, colorant(s) and/or additives. For example, the continuous phase may include at least one dye, at least one pigment, and/or at least one additive selected from the group consisting of plasticizers, biocides, hydrophobes, release agents, surface tension modifiers, emulsion stability enhancing components, wetting agents, synergic resins, dispersing agents, defoamers, surfactants, humectants, viscosity modifiers (e.g., thickeners), flow additives, and other additives known in the art. The additives can be added to the ink compositions in an amount such that the overall performance of the ink compositions is not adversely affected in any aspect. Such additives may also be present in the discontinuous phase.

Hydrophobes (e.g., xylene sulfonate) which cannot form micelles, but stay in the bulk water phase and add hydrophobicity to the system, linker molecules that enhance the surfactant-oil interaction, i.e., lipophilic linkers, or enhance the surfactant-water interaction, i.e., hydrophilic linkers (e.g., mono naphthalene sulfonate, alkyl naphthalene sulfonates, etc.), and extended surfactants which are modified to include one or more hydrophilic segments and/or hydrophobic segments between the polar surfactant head and the non-polar surfactant tail are particularly useful for making bicontinuous emulsions.

The ink compositions typically comprise from about 1 wt. % to about 99 wt. %, about 5 wt. % to about 95 wt. %. 10 wt. % to about 90 wt. %, and/or about 15 wt. % to about 85 wt. % of the solvent. The ink compositions typically comprise from about 0 wt. % to about 50 wt. %, about 1 wt. % to about 45 wt. %, 1.50 wt. % to about 40 wt. %, and/or about 2 wt. % to about 35 wt. % of the resin (solids). The ink compositions generally comprise about 0.01 wt. % to about 45 wt. %, 0.1 wt. % to about 35 wt. %, and/or about 0.5 wt. % to about 25 wt. % of the emulsifying agent. Alternatively, the ink compositions contain less than about 45 wt. %, and/or less than about 35 wt. % of the emulsifying agent.

By including various of the listed additives in the continuous and/or discontinuous phases, permanent writing inks, highlighting writing inks, dry erase writing inks, and other special purpose writing inks may be formulated, and their viscosities varied from very low values, for example, such as in free ink systems and marker systems, to very high values such as in gel writing inks and in ball point pen inks.

Also, some of the foregoing additives may function as an emulsifying agent. The emulsifying agent is a substance that stabilizes the emulsion and is generally selected from surface active substances including but not limited to surfactants, wetting agents, and dispersing agents. Other substances, which stabilize emulsions, including but not limited to alumina particles, silica particles, bentonite particles, magnesium aluminum silicate particles, fat crystals, magnesium oxide particles, magnesium trisilicate particles, coated titanium dioxide particles, tin oxide particles, may also be used. Typically, the particles are at least 10-fold, at least 50-fold, at least 100-fold, or at least 1000-fold smaller than the emulsified droplets. The emulsifying agent is present in an amount (or concentration) needed to effectively stabilize the emulsified components of the ink compositions.

The dispersed phase comprises at least one of a pigment dispersion, a lubricating agent, and a dye component. Of course, polymers or resins and conventional additives (such as those listed above) could also be included therein. The pigment dispersion generally comprises a pigment and a dispersing agent in a solvent including but not limited to water, solvents (e.g., relatively polar solvents and relatively non-polar solvents), and oils. The lubricating agent generally comprises an oil and/or a grease. The dye component generally comprises a liquid dye or dye solids optionally dissolved in a solvent such as water, organic solvents, and/or oils.

The ink compositions typically comprise from about 0.1 wt. % to about 65 wt. %, about 0.1 wt. % to about 55 wt. %, about 0.1 wt. % to about 50 wt. %, and/or about 0.5 wt. % to about 45 wt. % of the pigment (solids), when present. The ink compositions typically comprise from about 0.1 wt. % to about 25 wt. %, about 0.5 wt. % to about 20 wt. %, and/or about 0.5 wt. % to about 15 wt. % of the lubricating agent, when present. The ink compositions typically comprise from about 0.001 wt. % to about 45 wt. %, about 0.01 wt. % to about 35 wt. %, and/or about 0.1 wt. % to about 30 wt. % of the dye (active components), when present.

Pigmented permanent marker ink compositions in accordance with the disclosure generally comprise about 30 wt. % to about 92.5 wt. % and/or about 50 wt. % to about 91 wt. % of the solvent; about 5 wt. % to about 25 wt. % and/or about 5 wt. % to about 20 wt. % of the resin (solids); about 2 wt. % to about 30 wt. % and/or about 3 wt. % to about 15 wt. % of the pigment (solids); and about 0.5 wt. % to about 25 wt. % and/or about 1 wt. % to about 15 wt. % of the emulsifying agent. Such pigmented permanent marker ink compositions generally have a viscosity value of about 1 centipoise to about 40 centipoises (cps) and/or about 2 cps to about 15 cps.

Pigmented dry erase marker ink compositions in accordance with the disclosure generally comprise about 30 wt. % to about 95.5 wt. % and/or about 50 wt. % to about 94 wt. % of the solvent; about 2 wt. % to about 20 wt. % of the resin (solids); about 2 wt. % to about 30 wt. % and/or about 3 wt. % to about 15 wt. % of the pigment (solids); and about 0.2 wt. % to about 25 wt. % and/or about 1 wt. % to about 15 wt. % of the emulsifying agent. Such pigmented dry erase marker ink compositions generally have a viscosity value of about 1 cp to about 40 cps and/or about 5 cps to about 15 cps.

Pigmented highlighter marker ink compositions in accordance with the disclosure generally comprise about 55 wt. % to about 99.6 wt. % and/or about 50 wt. % to about 99 wt. % of the solvent; about 0 wt. % to about 20 wt. % and/or about 0 wt. % to about 10 wt. % of the resin (solids); about 0.2 wt. % to about 10 wt. % and/or about 0.2 wt. % to about 5 wt. % of the pigment (solids); and about 0.2 wt. % to about 15 wt. % and/or about 0.2 wt. % to about 5 wt. % of the emulsifying agent. Such pigmented highlighter marker ink compositions generally have a viscosity value of about 1 cp to about 40 cps and/or about 1 cps to about 15 cps.

Ball point pen ink compositions in accordance with the disclosure generally comprise about 30 wt. % to about 70 wt. % and/or about 30 wt. % to about 50 wt. % of the solvent; about 10 wt. % to about 50 wt. % and/or about 20 wt. % to about 40 wt. % of the resin (solids); about 0 wt. % to about 45 wt. % and/or about 0 wt. % to about 25 wt. % of the pigment (solids); and about 0.5 wt. % to about 25 wt. % and/or about 1 wt. % to about 15 wt. % of the emulsifying agent. Such ball point pen ink compositions generally have a viscosity value of at least about 750 cps and more typically at least about 1000 cps.

Correction (opaque) marker ink compositions in accordance with the disclosure generally comprise about 20 wt. % to about 70 wt. % and/or about 30 wt. % to about 65 wt. % of the solvent; about 5 wt. % to about 25 wt. % of the resin (solids); about 15 wt. % to about 55 wt. % and/or about 25 wt. % to about 50 wt. % of the pigment (solids); and about 0.5 wt. % to about 25 wt. % and/or about 1 wt. % to about 15 wt. % of the emulsifying agent. Such correction (opaque) marker ink compositions generally have a viscosity value less than about 40 cps, and often between about 5 cps and 25 cps.

Ink compositions containing multiple emulsions are generally prepared in two steps. In these emulsions, an oil-in-water or water-in-oil emulsion is dispersed in another liquid medium. Thus, an oil-in-water-in-oil emulsion comprises very small droplets of oil dispersed in the water liquid particles of a water-in-oil emulsion. Similarly, a water-in-oil-in-water emulsion consists of droplets of water dispersed in the oily phase of an oil-in-water emulsion.

For example, in the case of W/O/W emulsions, a high concentration of a lipophilic emulsifying agent is typically used in the oil phase in the first step of preparing a W/O emulsion; then a low concentration of a hydrophilic emulsifying agent is typically used in the water phase during the second step to form W/O/W emulsion. Ink compositions containing such W/O/W emulsions can be prepared by dispersing a basic or acidic solution into an oil, and then dispersing the resultant emulsion into a solution comprising water and leuco dyes, such as a pH indicator in its colorless state, to form a clear W/O/W ink composition. After application, the ink composition dries such that de-emulsion takes place, and the ink composition becomes colored.

When the term "water," "water-like," or "aqueous" are used herein to describe either a solvent or a continuous phase, a dispersed phase, or an aqueous phase, it is understood that relatively polar solvents (or mixtures thereof) are contemplated in addition to or entirely in place of water itself. Similarly, when the terms "oil" or "oily" are used herein to describe a solvent, or a continuous phase, a dispersed phase, or an oil phase, it is understood that relatively non-polar solvents (or mixtures thereof) are contemplated in addition to or in place of oil itself. The possible combinations of solvent components for formation of the various emulsions in accordance with the invention can easily be determined by those of ordinary skill.

When an oil or relatively non-polar phase is dispersed in water or a relatively polar phase, an oil-in-water emulsion is formed. In accordance with the foregoing definitions and descriptions of the terms water and oil, some oil-in-water emulsions might be further described as oil-in-solvent emulsions.

Oil-in-Water Emulsions

When water or a substantially aqueous solution is used as the continuous phase, the ink compositions have less volatile organic solvents and are more environmentally friendly. Another advantage of such systems allows one to include water incompatible (but oil compatible) ingredients in emulsion writing inks besides to reducing/eliminating ink settling/separation related problems.

In one exemplary system, a pigment dispersion in oil, for example, a pigment dispersed in an aliphatic solvent, can be emulsified into an ink composition comprising water. The pigment dispersion is typically not miscible with the solvent of the continuous phase. The pigment dispersion remains dispersed, however, when an emulsion is formed. Other colorants such as dyes or dye solutions and/or various modified colorant/pigment dispersions and/or oil pigment dispersions such as metallic pigment dispersions including but not limited to colored aluminum dispersions, aluminum pigment dispersions and bronze pigment dispersions, pearlescent pigment dispersions, and/or other special effect pigment dispersions may similarly be included in the ink compositions in addition to such pigment dispersions. Of course, lubricating agents may also be emulsified into the ink compositions.

Any polymer or polymer solution dispersions which are compatible with water or aqueous continuous phases can be included in such ink compositions. Suitable polymers include but are not limited to anionic polymers such as those available under the FIXOMER® trade name (Nalco Company, IL), polyvinyl alcohol polymers (Celanese Corporation, TX) polyvinylpyrrolidone polymers (International Specialty Products, NJ), sulfopolyester resin dispersions (Hexion Specialty Chemicals, Inc., OH) acrylic polymers such as those available under the JONCRYL® trade name (BASF Corp., WI), and mixtures thereof.

Suitable lubricating agents which can be emulsified into water or aqueous continuous phases include oils including but not limited to white mineral oils (Penreco, Tex.), aliphatic hydrocarbon solvents (such as those available under the DRAKESOL®, CONOSOL®, and MAGIESOL® trade names from Penreco, Tex.), silicone oils, and mixtures thereof. Other suitable lubricating agents include greases such as lanolin (Rolex Lanolin Products, Limited, India), greases such as those sold under the AMSOIL® trade name (Pecuniary, Inc., NC).

Suitable emulsifying agents which may be used to stabilize the oil-in-water emulsions are surfactants including but not limited to WITCONATE® 90 (Akzo Nobel Surfactants, IL); MACKANATE® DOS 70MS and MACKANATE® WCH-II (McIntyre Group, IL); ALKATERGE® T-IV (Dow Chemical Company, MI); EUMULGIN® O5 and CUTINA® E24 (Cognis, OH); BRIJ® 35, BRIJ® 30, BRIJ® 98, CIRRASOL™ G-1086, TWEEN® 80, TWEEN® 20, TWEEN® 60, HYPERMER® A394 (Uniqema, Del.), and mixtures of such surfactants. Of course, any other surface active agents that stabilize oil-in-water emulsions may also be used.

Any pigment dispersion in oil or relatively non-polar solvent may be used. Pigment dispersions for use in oil-in-water emulsions can either be prepared or purchased (commercially available pigment dispersions).

Representative commercially available pigment dispersions include but are not limited to alkyd pigment dispersions available under the TINT-AYD® AL trade name (Elementis Specialty, NJ), long oil alkyd dispersions (e.g., Formulator 24 A pigment dispersions available from Emerald Hilton-Davis, LLC, OH), short or medium oil alkyd dispersions (e.g., Industrial 42 A alkyd dispersions available from Emerald Hilton-Davis, LLC, OH), and any other suitable pigment dispersion in oil(s) or hydrocarbon solvent(s), with or without polymer and/or additional dispersing agents.

Alternatively, pigment dispersions for use in ink compositions containing an oil-in-water emulsion can be prepared by dispersing one or more pigments in a relatively non-polar solvent and/or oil. The pigments dispersions can optionally include a polymer and/or a dispersing agent. Many of the pigments (e.g., metallic pigments and pearlescent pigments) do not require special treatment to form a dispersion and can instead be prepared by mixing with solvent and any desired additives.

Suitable pigments which can be used to prepare pigment dispersions for use in ink compositions containing oil-in-water emulsions include but are not limited to titanium dioxide pigments, e.g., titanium dioxide pigments available under the TIPURE® trade name (Du Pont de Nemours, DE), the KRONOS® trade name (Kronos Inc, Houston, Tex.), and the TIOXIDE® trade name (Huntsman Tioxide, IL). Preferred titanium pigments include TIPURE® R-931, KRONOS™ 2131, KRONOS™ 2102, TIOXIDE® R-XL, and TIOXIDE® TR50, but of course other titanium pigments may also be used.

Additionally, organic pigments maybe formulated into pigment dispersions for use in ink compositions containing oil-in-water emulsions. Suitable organic pigments include but are not limited to red, green, blue, yellow, orange, and carbon black pigments (BASF Corporation, NJ; Clariant Corporation, NC; Emerald Hilton Davis, OH; Ciba Specialty Chemicals, Switzerland; Degussa Corporation, NJ; Cabot Corporation, MA; and, Columbian Chemicals Company, GA). Of course, any suitable organic pigment may be used.

Other pigments such as metallic pigments may also be formulated into pigment dispersions for use in ink compositions containing oil-in-water emulsions. Aluminum pigments and bronze pigments are exemplary metallic pigments (Schlenk-BOTH Metallic Pigments, MA; Wolstenholme International Inc., IL; Silberline Manufacturing Co., Inc., PA; Zuxing Enterprise Co., Ltd., China; and, Echart GmbH & Co. KG, Germany).

Additionally, pearlescent and other special effect pigments may be formulated into pigment dispersions for use in ink compositions containing oil-in-water emulsions (BASF Corporation, NJ; Ciba Specialty Chemicals, Switzerland; and Taizhu, China).

Inorganic colored pigments may also be formulated into pigment dispersions for use in ink compositions containing oil-in-water emulsions. Preferred inorganic colored pigments include but are not limited to colored titanium dioxide pigments available under the TICO™ trade name (Heubach, Germany) and colored mixed metal oxides inorganic pigments (Heubach, Germany and Cerdec Corporation, PA). Other suitable inorganic colored pigments such as colored aluminum pigments can also be used (Showa Aluminum Powder, K.K., Japan).

Suitable pigment dispersing agents for preparing pigment dispersions for use in ink compositions containing oil-in-water emulsions are compatible with oil and/or other relatively non-polar solvents. Exemplary dispersing agents and/or dispersing polymers include but are not limited to such dispersing agents sold under the SOLSPERSE™ trade name including SOLSPERSE™ 13940 and SOLSPERSE™ 3000 (Noveon, Inc., a subsidiary of The Lubrizol Corporation, OH), the NUOSPERSE® trade name, for example, NUOSPERSE® FA 196 (Elementis Specialty, NJ), the TEGO® trade name, for example, TEGO® Dispers 652 (Tego Chemie Service USA, VA); the SYLVAPRINT® trade name, for example, SYLVAPRINT® 3523 and SYLVAPRINT® 7002 (Arizona Chemical, FL), and YELKIN® TS lecithin (Archer Daniels Midland Company, Decatur, Ill.).

Oil-in-Solvent Emulsions

As previously indicated, some oil-in-water emulsions might be further described as oil-in-solvent emulsions. When a solvent, which is immiscible with the oil phase and is relatively more polar than the oil phase, is used as the continuous phase, various ingredients can be included in the oil phase and/or the solvent phase, for example, to enhance dry erasability. An advantage of such systems allows one to include solvent incompatible (but oil compatible) ingredients in emulsion writing inks formulated from relatively polar solvents. Additionally, when no or little water is present in ink compositions containing an oil-in-solvent emulsion, there are no concerns relating to freeze-thaw stability or growth of microorganisms.

In one exemplary system, a pigment dispersion in oil can be emulsified into an ink composition including a relatively polar solvent, for example, a solvent comprising a glycol ether and/or an alcohol. Although some aliphatic solvents may be miscible with glycol ether and/or alcohol solvents, the pigment dispersion is typically not miscible with the solvent of the continuous phase. The pigment dispersion remains dispersed, however, when an emulsion is formed. Other colorants such as dyes or dye solutions and/or various modified colorant/pigment dispersions and/or oil pigment dispersions such as metallic pigment dispersions including but not limited to colored aluminum dispersions, aluminum pigment dispersions and bronze pigment dispersions, pearlescent pigment dispersions, and/or other special effect pigment dispersions may similarly be included in the ink compositions in addition to such pigment dispersions. Of course, lubricating agents may also be emulsified into the ink compositions.

Suitable polymers which may be included in (relatively polar) solvent continuous phases include polyketone polymers (Hexion Specialty Company, OH), phenolic polymers (Hexion Specialty Company, OH), modified rosin ester polymers such as those available under the SYLVAPRINT® trade name (Arizona Chemical, FL) acrylic polymers (Dianal America, Inc., TX), cellulose acetate butyrate (CAB) polymers (Eastman Chemical Company, TN), polyvinyl butyral (PVB) polymers (Solutia, MO; Kuraray Specialties Europe GmbH, Germany; Sekisui Chemical, Co., Japan), numerous synthetic resins (Degussa, Germany), and mixtures thereof.

Suitable lubricating agents which can be emulsified into (relatively polar) solvent continuous phases include oils including but not limited to white mineral oils (Penreco, Tex.), aliphatic hydrocarbon solvents such as those available under the DRAKESOL®, CONOSOL®, and MAGIESOL® trade names (Penreco, Tex.), silicone oils, and mixtures thereof. Other suitable lubricating agents include greases such as lanolin (Rolex Lanolin Products, Limited, India), greases such as those sold under the AMSOIL® trade name (Pecuniary, Inc., NC).

Suitable emulsifying agents which may be used to stabilize the oil-in-solvent emulsions are surfactants including but not limited to WITCONATE® 90 (Akzo Nobel Surfactants, IL); MACKANATE® DOS 70MS and MACKANATE® WCH-II (McIntyre Group, IL); ALKATERGE® T-IV (Dow Chemical Company, MI); EUMULGIN® O5 and CUTINA® E24 (Cognis, Ohio); BRIJ® 35, BRIJ® 30, BRIJ® 98, CIRRASOL™ G-1086, TWEEN® 80, TWEEN® 40, TWEEN® 20, TWEEN® 60, HYPERMER® A394 (Uniqema, Del.), and mixtures of such surfactants. Of course, other surface active substances that stabilize oil-in-water emulsions may also be used.

Any pigment dispersion in oil or relatively non-polar solvent may be used. Pigment dispersions for use in oil-in-solvent emulsions can either be prepared or purchased (commercially available pigment dispersions).

Representative commercially available pigment dispersions include but are not limited to alkyd pigment dispersions available under the TINT-AYD® AL trade name (Elementis Specialty, NJ), long oil alkyd dispersions (e.g., Formulator 24 A pigment dispersions available from Emerald Hilton-Davis, LLC, OH), short or medium oil alkyd dispersions (e.g., Industrial 42 A alkyd dispersions available from Emerald Hilton-Davis, LLC, OH), and any other suitable pigment dispersion in oil(s) or hydrocarbon solvent(s), with or without polymer and/or additional dispersing agents.

Alternatively, pigment dispersions for use in ink compositions containing an oil-in-solvent emulsion can be prepared by dispersing one or more pigments in oil or a in a relatively non-polar solvent. The pigments dispersions can optionally include a dispersing agent. Many of the pigments (e.g., metallic pigments and pearlescent pigments) do not require special treatment to form a dispersion and can instead be prepared by mixing with solvent and any desired additives.

Suitable pigments which can be used to prepare pigment dispersions for use in ink compositions containing oil-in-solvent emulsions include but are not limited to titanium dioxide pigments, e.g., titanium dioxide pigments available under the TIPURE® trade name (Du Pont de Nemours, DE), the KRONOS™ trade name (Kronos Inc. Houston, Tex.), and the TIOXIDE® trade name (Huntsman Tioxide, IL). Preferred titanium pigments include TIPURE® R-931, KRONOS™ 2131, KRONOS™ 2102, TIOXIDE® R-XL, and TIOXIDE® TR50, but of course other titanium pigments may also be used.

Additionally, organic pigments may be formulated into pigment dispersions for use in ink compositions containing oil-in-solvent emulsions. Suitable organic pigments include but are not limited to red, green, blue, yellow, orange, and carbon black pigments (BASF Corporation, NJ; Clariant Corporation, NC; Emerald Hilton Davis, OH; Ciba Specialty Chemicals, Switzerland; Degussa Corporation, NJ; Cabot Corporation, MA; and, Columbian Chemicals Company, GA). Of course, any suitable organic pigment may be used.

Other pigments such as metallic pigments may also be formulated into pigment dispersions for use in ink compositions containing oil-in-solvent emulsions. Aluminum pigments and bronze pigments are exemplary metallic pigments (Schlenk-BOTH Metallic Pigments, MA; Wolstenholme International Inc., IL; Silberline Manufacturing Co., Inc., PA; Zuxing Enterprise Co., Ltd., China; and, Echart GmbH & Co. KG, Germany).

Additionally, pearlescent and other special effect pigments may be formulated into pigment dispersions for use in ink compositions containing oil-in-solvent emulsions (BASF Corporation, NJ; Ciba Specialty Chemicals, Switzerland; and Taizhu, China).

Inorganic colored pigments may also be formulated into pigment dispersions for use in ink compositions containing oil-in-solvent emulsions. Preferred inorganic colored pigments include but are not limited to colored titanium dioxide pigments available under the TICO™ trade name (Heubach, Germany) and colored mixed metal oxides inorganic pigments (Heubach, Germany and Cerdec Corporation, PA). Other suitable inorganic colored pigments such as colored aluminum pigments can also be used (Showa Aluminum Powder, K.K., Japan).

Suitable pigment dispersing agents for preparing pigment dispersions for use in ink compositions containing oil-in-solvent emulsions are compatible with oil and/or other relatively non-polar solvents. Exemplary dispersing agents and/or dispersing polymers include but are not limited to such dispersing agents sold under the SOLSPERSE™ trade name including SOLSPERSE™ 13940 and SOLSPERSE™ 3000 (Noveon, Inc., a subsidiary of The Lubrizol Corporation, OH), the NUOSPERSE® trade name, for example, NUOSPERSE® FA 196 (Elementis Specialty, NJ), the TEGO® trade name, for example, TEGO® Dispers 652 (Tego Chemie Service USA. VA); the SYLVAPRINT® trade name, for example, SYLVAPRINT® 3523 and SYLVAPRINT® 7002 (Arizona Chemical, FL), and YELKIN® TS lecithin (Archer Daniels Midland Company, Decatur, Ill.).

Water in Oil Emulsions

When oil or a relatively non-polar solvent is used as the continuous phase, the ink compositions can advantageously be used on water-sensitive substrates, for example, when highlighting markings made with water-soluble dye-based ink compositions, or when making a corrective marking with a correction fluid/ink composition over (erroneous) markings made with a water-soluble dye based ink composition. Another advantage of such systems allows one to include water compatible (but oil incompatible) ingredients in emulsion writing inks besides to reducing/eliminating ink settling/separation related problems.

In one exemplary system, a pigment dispersion in water can be emulsified into an ink composition including a relatively non-polar solvent, for example, an aliphatic hydrocarbon solvent, an aromatic solvent, an oil, or mixtures thereof. The pigment dispersion is typically not miscible with the solvent of the continuous phase. The pigment dispersion, however, remains dispersed when an emulsion is formed. Other colorants such as dyes or dye solutions may similarly be included in the ink compositions. Exemplary pigment dispersions include but are not limited to organic pigment dispersions, metallic pigment dispersions, colored aluminum dispersions, aluminum pigment dispersions, bronze pigment dispersions, pearlescent pigment dispersions, other special effect pigment dispersions, and/or mixtures thereof. Of course, other water-based (or compatible) lubricating agents may also be emulsified into the ink compositions.

Any polymer or polymer solution/dispersions which are compatible with the relatively non-polar continuous phases can be included in such ink compositions, especially polymers that are soluble in aliphatic hydrocarbon solvents. Suitable polymers include but are not limited to aliphatic hydrocarbon polymers such as those available under the NEVTAC® trade name (Neville Chemical Company, PA), hydrocarbon resins such as those available under the SYLVAPRINT® trade name (Arizona Chemical, FL), e.g., a terpene phenol resin SYLVAPRINT® 7002, hydrogenated hydrocarbon resins such as those sold under the ARKON™ trade name, (Arakawa Chemical (USA), FL) rosin modified phenolic resins such as those sold under the TAMANOL™ trade name (Arakawa Chemical (USA), IL), vinyl acrylic polymers such as those sold under the PLIOWAY® trade name including Ultra 200and PLIOWAY® Ultra 350 (Eliokem, Akron, Ohio), acrylic resins such as NEOCRYL® B-705 (DSM NeoResin, MA); and DIANAL™ MB (Dianal America, Inc., TX), and mixtures thereof.

Suitable emulsifying agents which may be used to stabilize the water-in-oil emulsions are surfactants including but not limited to LAMEFORM® TGI, MONOMULS 90-018®, DEHYMULS® PGPH, DEHYMULS® HRE7, EMEREST® 2712, and EMEREST® 2452 (Cognis, Ohio); BRIJ® 93 VEG, SPAN® 80, ATLOX® 4912, HYPERMER® B246SF (Uniqema, Del.), and mixtures of such surfactants. Of course, any other surface active substances that stabilize oil-in-water emulsions may also be used.

Any pigment dispersion in water or aqueous solution may be used. Pigment dispersions for use in water-in-oil emulsions can either be prepared or purchased (commercially available pigment dispersions).

Representative commercially available pigment dispersions in water and/or a relatively polar solvent suitable for incorporation into ink compositions containing water-in-oil emulsions in accordance with the disclosure include but are not limited to pigment dispersions available under the TINT-AYD® trade name including TINT-AYD® WD and TINT-AYD® CW products (Elementis Specialty, NJ), the CAB-O-JET® trade name (Cabot Corporation, MA), and the XFAST™ trade name (BASF Corporation, NJ).

Alternatively, pigment dispersions for use in ink compositions containing a water-in-oil emulsion can be prepared by dispersing one or more pigments in a water and/or other relatively polar solvent. The pigments dispersions can optionally include a polymer and/or a dispersing agent. Many of the pigments (e.g., metallic pigments and pearlescent pigments) do not require special treatment to form a dispersion and can instead be prepared by mixing with water and any desired additives.

The pigments dispersions can optionally include a polymer and/or a dispersing agent. Many of the pigments (e.g., metallic pigments and pearlescent pigments) do not require special treatment to form a dispersion and can instead be prepared by mixing with water and any desired additives.

Suitable pigments which can be used to prepare pigment dispersions for use in ink compositions containing water-in-oil emulsions include but are not limited to titanium dioxide pigments, e.g., titanium dioxide pigments available under the TIPURE® trade name (Du Pont de Nemours, DE), the KRONOS™ trade name (Kronos Inc, Houston, Tex.), and the TIOXIDE® trade name (Huntsman Tioxide, IL). Preferred titanium pigments include TIPURE® R-706, TIPURE® R-902, TIPURE® R-931, KRONOS™ 2310, KRONOS™ 2131, KRONOS™ 2044, TIOXIDE® R-XL, TIOXIDE® TR50, and TIOXIDE® TR93, but of course other titanium pigments may also be used.

Additionally, organic pigments may be formulated into pigment dispersions for use in ink compositions containing pigment dispersions as water-in-oil emulsions. Suitable organic pigments include but are not limited to red, green, blue, yellow, orange, and carbon black pigments (BASF Corporation, NJ; Clariant Corporation, NC; Emerald Hilton Davis, OH; Ciba Specialty Chemicals, Switzerland; Degussa Corporation, NJ; Cabot Corporation, MA; and, Columbian Chemicals Company, GA). Of course, any suitable organic pigment may be used.

Additionally, pearlescent and other special effect pigments may be formulated into pigment dispersions for use in ink compositions containing water-in-oil emulsions (BASF Corporation, NJ; Ciba Specialty Chemicals, Switzerland; and Taizhu, China).

Other pigments including but not limited to inhibited, protected, or coated metallic pigments may also be formulated into pigment dispersions for use in ink compositions containing water-in-oil emulsions. Exemplary coated metallic pigments include coated aluminum pigments and coated bronze pigments (Schlenk-BOTH Metallic Pigments, MA; Wolstenholme International Inc., IL; Silberline Manufacturing Co., Inc., PA; Zuxing Enterprise Co., Ltd., China; and, Echart GmbH & Co. KG, Germany).

Inorganic colored pigments may also be formulated into pigment dispersions for use in ink compositions containing water-in-oil emulsions. Preferred inorganic colored pigments include but are not limited to colored titanium dioxide pigments available under the TICO™ trade name (Heubach, Germany) and colored mixed metal oxides inorganic pigments (Heubach, Germany and Cerdec Corporation, PA). Other suitable inorganic colored pigments such as colored aluminum pigments can also be used (Showa Aluminum Powder, K.K., Japan).

Suitable pigment dispersing agents for preparing pigment dispersions for use in ink compositions containing water-in-oil emulsions are compatible with water and/or relatively polar solvents. Exemplary dispersing agents and/or dispersing polymers include but are not limited to such dispersing agents sold under the NUOSPERSE™ trade name including NUOSPERSE™ W-30, NUOSPERSE™ 2000, and NUOSPERSE™ FA 196 (Elementis Specialty, NJ), the ZETASPERSE® trade name, for example, ZETASPERSE® 1200, ZETASPERSE® 1400, ZETASPERSE® 1600, ZETASPERSE® 2100, ZETASPERSE® 2300 (Air Products and Chemicals, Inc., PA) the HYDROPLAT® trade name (Cognis, Ohio), and dispersing acrylic polymers such as those available under the JONCRYL® trade name (BASF Corp., WI), and mixtures thereof.

The emulsion-containing ink compositions in accordance with the disclosure and writing instruments comprising same can be better understood in light of the following examples, which are merely intended to illustrate the ink compositions, and are not meant to limit the scope thereof in any way.

EXAMPLE 1

Ball Point Pen Ink Composition Containing an Emulsion

Resin polymer solution was prepared by dissolving 12 grams of a film-forming polymer (BL-10 vinyl butyral polymer, Sekisui Chemical Co., Ltd, Japan) into an amount of a solvent (dipropylene glycol methyl ether) sufficient to form 40 grams of resin polymer solution (30 weight percent (wt. %) resin polymer solution).

30 grams of a colorant (REACTINT® Blue X3LV polymeric dye colorant, Milliken & Company, SC) and 3.0 g of an emulsifying agent (CIRRASOL™ G-1086, Uniqema, Del.) were added to the resin polymer solution, and the resulting composition was mixed well. 1.0 g of a lubricating agent (Drakesol 260AT light mineral oil, Penreco, Tex.) was added under mixing to form a ball pen ink composition.

The oil was emulsified into the ink as an oil-in-water emulsion (more particularly, an oil-in-solvent emulsion). No oil separation was observed overnight.

The ink was loaded into a standard ballpoint pen. The pen wrote smoothly.

EXAMPLE 2

Ball Point Pen Ink Composition Containing an Emulsion 65 grams of a lubricating agent (Drakesol 260 AT light mineral oil, Penreco, Tex.) were mixed with 5 grams of a polymeric dispersing agent (SOLSPERSE® 13940, Noveon, Inc., OH). 30 grams of a colorant (Heliogen Blue D7079 pigment, BASF, NJ) were added to the mixture under mixing, and the pigment was dispersed until a pigment dispersion having a Hegman grind reading of 8 was obtained.

30 grams of a colorant (REACTINT® Blue X3LV polymeric dye colorant, above), 40 grams of 30 wt. % resin polymer solution (BL-10 vinyl butyral polymer, described in Example 1), and 6 grams of an emulsifying agent (CIRRASOL™ G-1086, described in Example 1) were mixed together to form an ink mixture.

10 grams of the above pigment dispersion were added to the ink mixture under strong mixing to form a ball point pen ink composition.

The pigment dispersion and the oil were emulsified into the formed ink as oil-in-water emulsions (more particularly, an oil-in-solvent emulsion). No oil separation or pigment separation were observed overnight, and a ball point pen loaded with this ink wrote smoothly.

The written marks are expected to demonstrate increased fade resistance because the ball pen inks contain an emulsified pigment and not just dyes or polymeric dye colorants, which are less permanent and more susceptible to fading over time.

EXAMPLE 3

Marker Ink Composition Containing an Emulsion 65 grams of light mineral oil (260 AT, described in Example 1) were mixed with 5 grams of a polymeric dispersing agent (SOLSPERSE® 13940, described in Example 2). 30 grams of colorant (HELIOGEN® Blue D7079 pigment, described in Example 2) were added to the mixture under mixing, and the pigment was dispersed in the mineral oil until a pigment dispersion having a Hegman grind reading of 8 was obtained.

55 grams of a relatively polar solvent (propylene glycol methyl ether) were mixed with 3 grams of an emulsifying agent (CIRRASOL™ G-1086, above). 20 grams of the pigment dispersion were added to this mixture under strong mixing, and then 20 grams of 30 wt. % resin polymer solution (BL-10 vinyl butyral polymer, described in Example 1) were introduced under mixing to provide a marker ink composition.

The pigment dispersion was emulsified into the ink as an oil-in-water emulsion (more particularly, an oil-in-solvent emulsion). No pigment separation was observed overnight, and a marker (comprising a fibrous reservoir in fluid communication with a fibrous nib) loaded with this ink wrote well.

The written marks are also expected to demonstrate increased fade resistance because the inks contain an emulsified pigment (and not dyes or polymeric colorants, which are less permanent and more susceptible to fading over time).

EXAMPLE 4

Marker Ink Composition Containing an Emulsion 5 grams of a surfactant including a copolymer comprising ethylene oxide and propylene oxide (TERGITOL™ XD surfactant, Dow, MI) were mixed with 60 grams of water and 1 drop of defoamer to form an aqueous surfactant solution. 20 grams of a green pigment dispersion in an organic solvent mixture that is substantially aliphatic (TINT-AYD® AL 703, Elementis, UK) were added into the aqueous surfactant solution under strong mixing. 10 grams of a film-former polymer solution including 12 wt. % of an anionic copolymer comprising 30% methacrylic acid and 70% acrylamidomethyl propane sulfonate (FIXOMER™ A30 polymer solution, Nalco Company, IL) were then added under mixing.

The pigment dispersion was emulsified into the ink as an oil-in-water emulsion. No pigment separation was observed overnight, and a marker (comprising a fibrous reservoir in fluid communication with a fibrous nib) loaded with this ink wrote well.

The written marks are expected to be washable because the anionic copolymer is water-soluble.

EXAMPLE 5

Marker Ink Composition Containing an Emulsion 3.5 grams of a first surfactant (BRIJ® 30, Uniqema, Del.) and 3.5 grams of a second surfactant (HYPERMER® B206, Uniqema, Del.) were mixed with 50 grams VM & P Naphtha solvent (Chemcentral, IL) to form a solvent surfactant mixture, 5 grams of a pigment dispersion in an aqueous solvent mixture (CAB-O-JET® 250C Cyan Colorant, Cabot Corporation, MA) was added to the solvent surfactant mixture under moderate mixing.

The pigment dispersion was emulsified into the ink as an water-in-oil emulsion. No pigment separation was observed overnight.

EXAMPLE 6

Marker Ink Composition Containing an Emulsion

The ink of Example 5 was modified by addition of 10 grams to 20 grams of a solution comprising 40 wt. % of a hydrocarbon resin (NEVTAC® 100 polymer, Neville Chemical Company, PA) in VM&P Naphtha solvent (Chemcentral, IL).

The pigment dispersion was emulsified into the ink as a water-in-oil emulsion. No pigment separation was observed overnight, and a marker loaded with this ink wrote well.

What is claimed is:

1. An emulsion-containing ink composition having a continuous phase and a discontinuous phase, the ink composition comprising:
   a continuous phase comprising a colorant and at least one of water and a polar solvent; and,
   a discontinuous phase comprising a lubricating agent emulsified into the ink composition as an oil-in-water emulsion.

2. The ink composition of claim 1, wherein the continuous phase comprises at least one dye or at least one pigment, and the discontinuous phase further comprises an oil pigment dispersion, a non-polar solvent pigment dispersion, or a dye solution emulsified into the ink composition as an oil-in-water emulsion.

3. The ink composition of claim 1, wherein the continuous phase further comprises a polymer.

4. A writing instrument containing the ink composition of claim 1.

5. The writing instrument of claim 4, wherein the writing instrument is a marker or a ball pen selected from the group consisting of roller ball pens, gel pens, and ball point pens.

6. The writing instrument of claim 5, wherein the writing instrument is a ball point pen, and the viscosity of the ink composition is greater than about 750 centipoises (cps).

7. A writing instrument comprising:
   a writing point in fluid communication with an ink reservoir containing an emulsion-containing ink composition, said emulsion-containing ink composition having a continuous phase and a discontinuous phase, said emulsion-containing ink composition comprising:
   a continuous phase comprising a solvent; and,
   a discontinuous phase comprising a pigment dispersion emulsified into the ink composition as either an oil-in-water emulsion or a water-in-oil emulsion.

8. The writing instrument of claim 7, wherein the continuous phase further comprises a polymer.

9. The writing instrument of claim 7, wherein the solvent of the continuous phase comprises at least one of water and a polar solvent, and the discontinuous phase pigment dispersion comprises an oil pigment dispersion or a non-polar solvent pigment dispersion such that it is emulsified into the ink composition as an oil-in-water emulsion.

10. The writing instrument of claim 7, wherein the discontinuous phase further comprises a dye emulsified into the ink composition as either an oil-in-water emulsion or a water-in-oil emulsion.

11. The writing instrument of claim 7, wherein the continuous phase further comprises a colorant.

12. The writing instrument of claim 7, wherein the solvent of the continuous phase comprises a non-polar solvent, and the discontinuous phase pigment dispersion comprises an aqueous pigment dispersion such that it is emulsified into the ink composition as a water-in-oil emulsion.

13. The writing instrument of claim 7, wherein the writing instrument is a marker or a ball pen selected from the group consisting of roller ball pens, gel pens, and ball point pens.

14. The writing instrument of claim 7, wherein the writing instrument is a ball point pen, and the viscosity of the ink composition is greater than about 750 centipoises (cps).

15. The writing instrument of claim 7, wherein the writing instrument is a marker and the ink composition has a viscosity less than 40 cps.

16. An emulsion-containing ink composition having two continuous phases, the ink composition comprising:
   a first continuous phase comprising an oil or a non-polar solvent; and,
   a second continuous phase comprising water or a polar solvent,
   wherein at least one of the first and second continuous phases comprises at least one of a dye and a pigment dispersion.

17. The ink composition of claim 16, wherein at least of the first and second continuous phases comprises a polymer.

18. A writing instrument containing the ink composition of claim 16.

* * * * *